United States Patent
Shum et al.

(10) Patent No.: US 7,724,952 B2
(45) Date of Patent: May 25, 2010

(54) OBJECT MATTING USING FLASH AND NO-FLASH IMAGES

(75) Inventors: Heung-Yeung Shum, Redmond, WA (US); Jian Sun, Beijing (CN); Sing Bing Kang, Redmond, WA (US); Yin Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 11/434,567

(22) Filed: May 15, 2006

(65) Prior Publication Data

US 2007/0263119 A1 Nov. 15, 2007

(51) Int. Cl.
*G06K 9/34* (2006.01)
(52) U.S. Cl. .................................... 382/173
(58) Field of Classification Search ........... None
See application file for complete search history.

(56) References Cited

U.S. PATENT DOCUMENTS

| | | | |
|---|---|---|---|
| 3,095,304 A | 6/1963 | Vlahos | |
| 3,158,477 A | 11/1964 | Vlahos | |
| 4,417,791 A | 11/1983 | Erland et al. | |
| 5,574,511 A * | 11/1996 | Yang et al. | 348/586 |
| 5,781,198 A | 7/1998 | Korn | |
| 5,923,380 A * | 7/1999 | Yang et al. | 348/586 |
| 6,134,345 A | 10/2000 | Berman et al. | |
| 6,288,703 B1 | 9/2001 | Berman et al. | |
| 6,912,313 B2 | 6/2005 | Li | |
| 6,950,130 B1 | 9/2005 | Qian | |
| 7,102,638 B2 * | 9/2006 | Raskar et al. | 345/428 |
| 7,103,227 B2 * | 9/2006 | Raskar et al. | 382/266 |
| 7,206,449 B2 * | 4/2007 | Raskar et al. | 382/199 |
| 7,218,792 B2 * | 5/2007 | Raskar et al. | 382/254 |
| 7,259,747 B2 * | 8/2007 | Bell | 345/156 |
| 7,295,720 B2 * | 11/2007 | Raskar | 382/312 |
| 7,443,443 B2 * | 10/2008 | Raskar et al. | 348/370 |
| 2001/0028735 A1 | 10/2001 | Pettigrew | |
| 2002/0154828 A1 | 10/2002 | Kobilansky | |
| 2004/0032409 A1 | 2/2004 | Girard | |
| 2004/0042654 A1 | 3/2004 | Sevigny | |
| 2004/0170340 A1 | 9/2004 | Tipping et al. | |
| 2004/0184677 A1 * | 9/2004 | Raskar et al. | 382/284 |
| 2006/0002635 A1 | 1/2006 | Nestares et al. | |

FOREIGN PATENT DOCUMENTS

WO   WO 00/79779   12/2000

OTHER PUBLICATIONS

Baxes, Digital Image Processing- principle and applications, John Wiley & Sons, Inc., 1994, pp. 84-85.*

(Continued)

*Primary Examiner*—Yuzhen Ge
(74) *Attorney, Agent, or Firm*—Steven M. Koehler; Westman, Champlin & Kelly P.A.

(57) ABSTRACT

Foreground object matting uses flash/no-flash images pairs to obtain a flash-only image. A trimap is obtained from the flash-only image. A joint Bayesian algorithm uses the flash-only image, the trimap and one of the image of the scene taken without the flash or the image of the scene taken with the flash to generate a high quality matte that can be used to extract the foreground from the background.

18 Claims, 8 Drawing Sheets

OTHER PUBLICATIONS

T. Pajdla and J. Matas (Eds.): ECCV 2004, LNCS 3023, pp. 342-354, 2004, © Springer-Verlag Berlin Heidelberg 2004.
Amit Agrawal et al., Removing Photography Artifacts using Gradient Projection and Flash-Exposure Sampling, 2005 ACM pp. 828-835.
Elmar Eisemann, Flash Photography Enhancement via Intrinsic Relighting, pp. 673-678, Year of publication:2004, Proceedings of the 2004 SIGGRAPH Conference.
Apostoloff, N., and Fitzgibbon, A. 2004. Bayesian video matting using learnt image priors. In Proceedings of CVPR 2004.
Canny, J. 1986. A computational approach to edge detection. IEEE Trans. on PAMI. 8, 6, 679-698.
Chuang, Y.-Y., Curless, B., Salesin, D. H., and Szeliski, R. 2001. A bayesian approach to digital matting. In Proceedings of CVPR 2001, vol. II, 264-271.
Chuang, Y.-Y., Agarwala, A., Curless, B., Salesin, D. H., and Szeliski, R. 2002. Video matting of complex scenes. In Proceedings of ACM SIGGRAPH 2002, 243-248.
Feris, R., Raskar, R., Chen, L., Tan, K., and Turk, M. 2005. Discontinuity preserving stereo with small baseline multi-flash illumination. In Proceedings of ICCV 2005, vol. I, 412-419.
Hillman, P., Hannah, J., and Renshaw, D. 2001. Alpha channel estimation in high resolution images and image sequences. In Proceedings of CVPR 2001, vol. I, 1063-1068.
McGuire, M., Matusik, W., Pfister, H., Hughes, J. F., and Durand, F. 2005. Defocus video matting. In Proceedings of ACM SIGGRAPH, 567-576.

Nayar, S. K., and Narasimhan, S. G. 2002. Assorted pixels: Multi-sampled imaging with structural models. In Proceedings of ECCV 2002, vol. IV, 636-652.
Petschnigg, G., Agrawala, M., Hoppe, H., Szeliski, R., Cohen, M., and Toyama., K. 2004. Digital photography with flash and no-flash image pairs. In Proceedings of ACM SIGGRAPH 2004, 664-672.
Porter, T., and Duff, T. 1984. Compositing digital images. *In Proceedings of ACM SIGGRAPH '84*, 253-259.
Qian, R.J., and Sezan, M.I. 1999. Video background replacement without a blue screen. *In Proceedings of ICIP 1999*, 143-146.
Raskar, R., han Tan, K., Feris, R., Yu, J., and Turk, M. 2004. Non-photorealistic camera: Depth edge detection and stylized rendering using multi-flash imaging. In *Proceedings of ACM SIGGRAPH 2004*, 673-678.
Ruzon, M. A., and Tomasi, C. 2000. Alpha estimation in natural images. *In Proceedings of CVPR 2000*, 18-25.
Smith, A. R., and Blinn, J. F. 1996. Blue screen matting. *In Proceedings of ACM SIGGRAPH 1996*, 259-268.
Sun, J., Jia, J., Tang, C.-K., and Shum, H.-Y. 2004. Poisson matting. In Proceedings of ACM SIGGRAPH, 315-321.
Wang, J., and Cohen, M. 2005. An iterative optimization approach for unified image segmentation and matting. *In Proceedings of ICCV 2005*, vol. II, 936-943.

* cited by examiner

OBJECT MATTING USING FLASH AND NO-FLASH IMAGES

BACKGROUND

The discussion below is merely provided for general background information and is not intended to be used as an aid in determining the scope of the claimed subject matter.

Image processing or manipulation is growing in popularity. With the increased power and decrease cost of computers, home users would like to manipulate images for scrapbooks and the like. Likewise, professional editing studios have a need to manipulate images for a wide variety of commercial needs such as advertising and marketing.

One particular need is to have the ability to separate the foreground object(s) (hereinafter referred to as "foreground object" or "foreground") from the background object(s) (hereinafter referred to as "background object" or "background") of an image. In this manner for example, the foreground object can be removed from the original image and transferred to a second image, thus making it appear that the second image was taken with the foreground object extracted from the first image.

In order to separate the foreground object from the background, a matte is typically required. The most common approach for obtaining a matte is blue screen matting, in which a foreground object is captured in front of a known solid-colored background, usually blue or green. Blue screen matting is the standard technique employed in the movie and TV industries because a known background greatly simplifies the matting problem. However, blue screen matting requires an expensive well-controlled studio environment to reduce artifacts such as blue spill, backing shadows, and backing impurities. Such a system is not available to the typical consumer. In addition, blue screen matting is less suitable for outdoor scenes.

Other techniques include using a single natural image to obtain the matte. First, the input image is manually partitioned into three regions by the user: definitely foreground, definitely background, and unknown regions. These three regions are collectively referred to as the "trimap". Then, the matte, foreground color, and background color are estimated for all pixels in the unknown region.

Although these methods and others have produced results, accurately separating the foreground object from the background object is difficult. This is particularly true when the foreground and the background are alike, or when highly textured foreground or background objects are present in the image, for example, the windblown hair of a person taken against a complex background.

SUMMARY

The Summary and Abstract are provided to introduce a selection of concepts in a simplified form that are further described below in the Detailed Description. The Summary and Abstract are not intended to identify key features or essential features of the claimed subject matter, nor are they intended to be used as an aid in determining the scope of the claimed subject matter. In addition, the claimed subject matter is not limited to implementations that solve any or all disadvantages noted in the background.

A method is described that allows a user to separate foreground objects from the background. In particular, the method uses flash/no-flash image pairs of the same scene. In order to separate the foreground objects from the background, a high quality matte that shows the demarcation of the foreground objects from the background objects is needed. Generation of the matte capitalizes on the dominant change in the appearance of the foreground objects, for example, caused by the flash to disambiguate the foreground objects from the background.

The matte can be generated using a joint Bayesian flash matting algorithm based on a flash-only image formed from the difference of the flash/no-flash image pair, and one of the images of the flash/no-flash image pair. The resulting high quality matte allows extraction even when the foreground and background are indistinguishable or the background has complex color distributions.

The method can be used both on scenes taken indoors as well as outdoors. In addition, the approach is automatable and can be implemented using consumer-level photographic and computing equipment; thus capable of being implemented by users without specialized training or knowledge.

DETAILED DESCRIPTION

Figure 1:
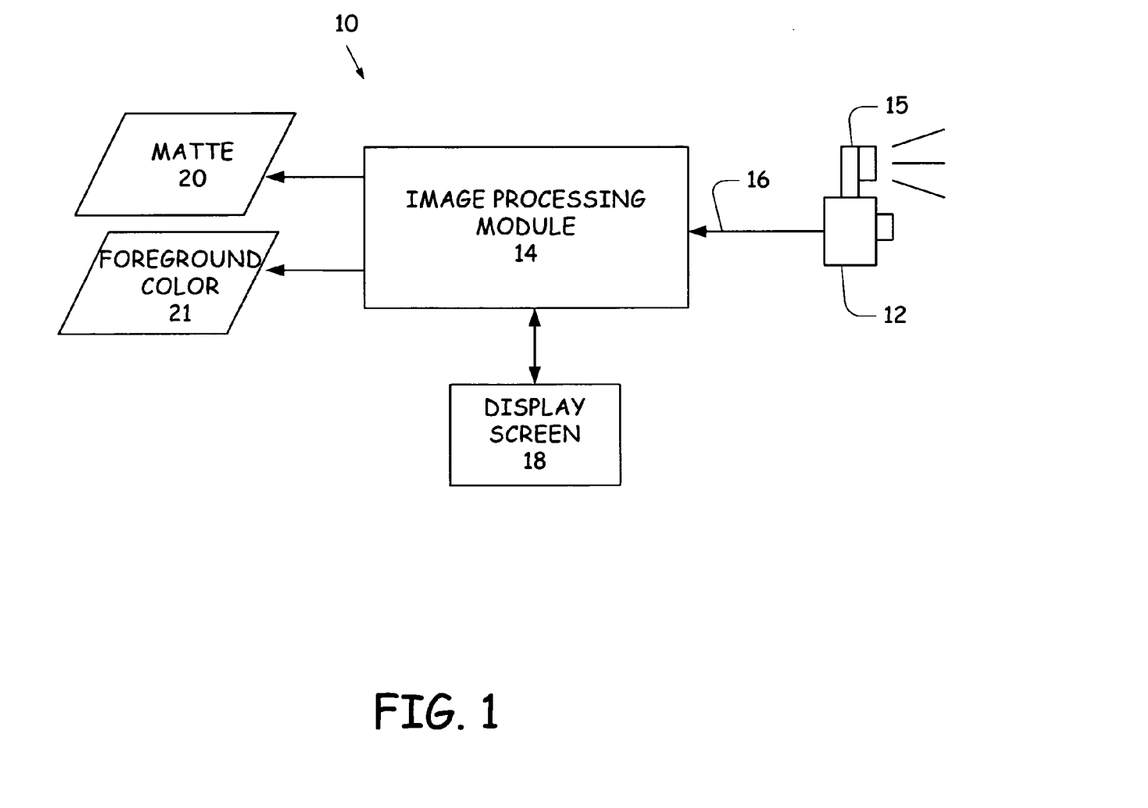
FIG. 1 is a diagrammatic representation of a system for processing digital images.
Figure 6:
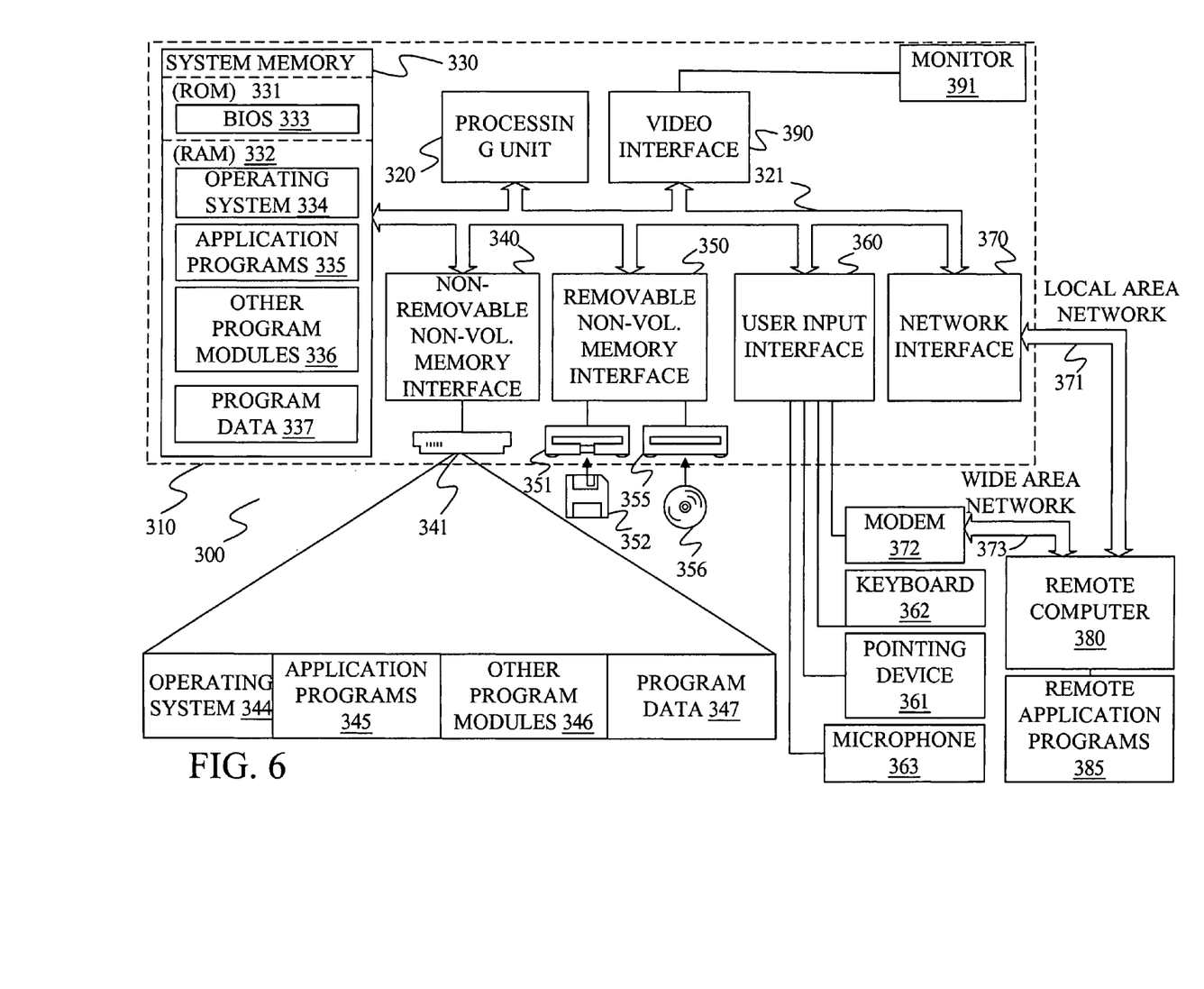
FIG. 6 is a block diagram of an exemplary computing environment.

A system 10 for capturing and processing images is illustrated in FIG. 6. System 10 includes an image capture device 12 and an image processing module 14 capable of receiving images obtained from image capture device 12. The image capture device 12 includes any device such as, but not limited to, a CCD (charge-coupled device) photosensitive array. The image capture device 12 could be, for instance, an electronic camera or a camcorder. As will be explained below, one of the images is taken with a flash or lighting module 15 to provide additional light beyond ambient conditions. The flash module 15 can emit light in the visible or non-visible spectrum, whereby image capturing module such as the CCD photosensitive array is adapted to generate suitable signals in response to light in the visible and/or non-visible spectrum in order to generate the corresponding image. However, a particularly advantageous embodiment is realized when a flash module is used that emits visible light since the concepts herein described can be practiced using consumer oriented photographic and computer. processing equipment.

Image processing module 14 processes images in a manner discussed below so as to extract a selected portion from an image, allowing the user to manipulate the extracted portion, for example, by inserting it into another image. A display 18 can be provided for rendering images during processing or manipulation.

Images can be received from image capture device 12 (represented by arrow 16) using one or combination of many known technologies such as but not limited to a wired or wireless connection between image capture device 12 and image processing module 14, or transfer of images using removable storage media. Image processing module 14 can be implemented in hardware and/or software, for example, as an application executable on a suitable computer system, an exemplary embodiment of which is provided below.

As is known, a new image I can be obtained from a foreground image F and a background image B elements according to the following compositing equation:

$$I = \alpha F + (1-\alpha) B, \qquad \text{Eq. 1}$$

where $\alpha$ is a matte (also known as "alpha channel") used to define the foreground from the background. Conversely, the goal of image matting is to estimate $\alpha$, F, and B from a given image I.

One aspect herein described uses two images taken of the same scene from which the foreground and background can be automatically obtained. In particular, a first image of the scene is obtained with a first level of light intensity (herein also referred to as "no-flash" intensity) upon the scene, commonly, although not exclusively, at an ambient light level. A second image is then obtained at an increased light intensity (herein also referred to as "flash" intensity) such as from flash module 15. The flash and no-flash images comprise an image pair and can be taken with the same image capture device 12 in near temporal proximity, limited only by the speed of the image capture device 12 and the time necessary to activate the flash module 15. By taking the two images as close together as possible in time, problems created by the movement of objects in the scene and thus the image can be avoided. More specifically, as long as the movement of the line of demarcation between the exposures is not detectable by the human eye, then the movement of the object is negligible and considered static. Typically, a maximum time differential between exposures of about 1/30th of a second (i.e., the shutter speed of an electronic camera) will ensure negligible movement of the object. However, if the images captured are of high resolution, even very small object movements between snapshots can result in shifts of several pixels. These shifts cause visible artifacts at the boundaries; to remove them, some form of motion compensation is required. Of course, if the object of the image is stationary, then the images can be taken at any time.

In a manner discussed below, the foreground and background can be obtained from the image pair. This may entail obtaining a "trimap" having image portions defined as "definitely foreground," "definitely background," and possibly "unknown" regions. Image processor 14 generates a high-quality matte 20 that can be used to separate the foreground from the background even when the foreground and the background have similar colors or when the background is complex. The foreground color 21 is also estimated by image processor 14 for the image composition. In addition, no special studio environment is required for taking the images.

For a static foreground and a fixed camera, the matte $\alpha$ of the foreground can be assumed unchanged in the no-flash image I and the flash image $I^f$. The compositing or matting equations for I and $I^f$ can be represented as:

$$I = \alpha F + (1-\alpha) B \qquad \text{Eq. 2}$$

$$I^f = \alpha F^f + (1-\alpha) B^f \qquad \text{Eq. 3}$$

where $\{F, B\}$ are the ambient foreground and background colors, and $\{F^f, B^f\}$ are the flash foreground and background colors, respectively. Treating the flash as a point light source with intensity L, the radiance E due to direct illumination from the flash on surface point P in the scene is $$E = L \cdot \rho(\omega_i, \omega_o) \cdot r^{-2} \cdot \cos \theta,$$

where $\rho(\omega_i, \omega_o)$ is the surface BRDF ("Bidirectional Reflectance Distribution Function"), $\omega_i$ and $\omega_o$ are flash and view directions with respect to the local coordinate frame at P, r is the distance from the flash, and $\theta$ is the angle between the flash direction and the surface normal at P. This inverse square law explains why the flash intensity falls off quickly with distance r.

When the image capture device 12 and flash module 15 are together and the background scene is distant from the image capture device 12, the intensity change of the background in flash and no-flash images will be small, $B^f \approx B$, realizing the following equation:

$$I^f = \alpha F^f + (1-\alpha) B.$$

Subtracting $I^f$ from I yields a difference image I' (foreground oriented) according to the following equation:

$$I' = I^f - I = \alpha(F^f - F) = \alpha F', \qquad (4)$$

where $F' = (F^f - F)$ is the additional flash foreground color. Herein the difference image I' is also referred to as the "flash-only" image. The flash-only image I' is independent of how similar the foreground and background are or the complexity of the background.

Figure 2A:
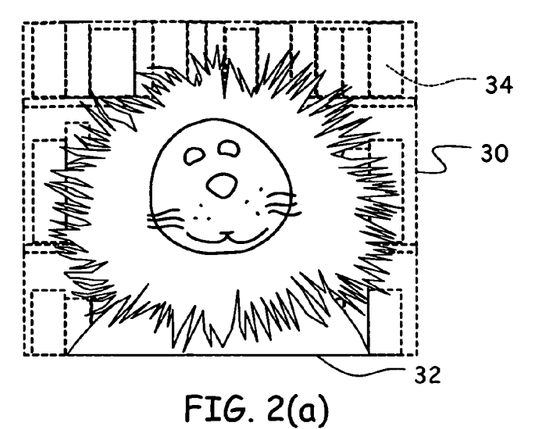
FIGS. 2(a)-(f) are pictorial representations of images.
Figure 2B:
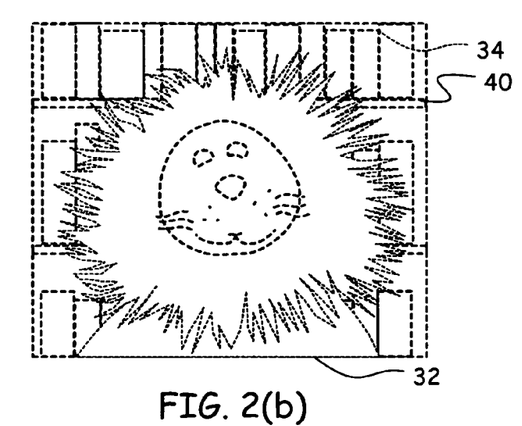
Figure 2C:
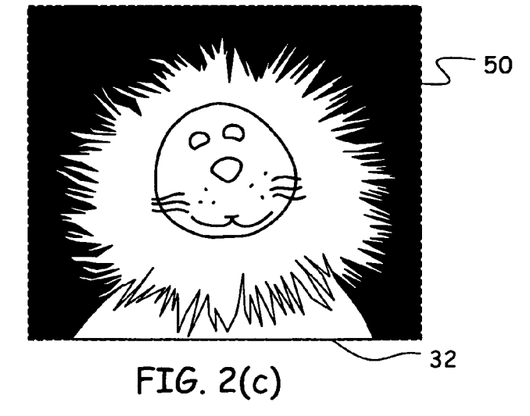

FIGS. 2(a)-(c) pictorially illustrate images so far discussed. FIG. 2(a) is a pictorial representation of an image 30 of a toy lion 32 comprising the foreground of the image 30 in front of a background of shelves of books 34. In particular, FIG. 2(a) represents a flash image of the toy lion 32, where features of the toy lion 32 are illustrated with solid lines, and where the background being less illuminated by the flash, is illustrated with dashed lines. FIG. 2(b) represents a no-flash image 40 of the same scene as FIG. 2(a), but where no flash is provided, hence the features of the toy lion 30 are also illustrated in dashed lines. Finally, FIG. 2(c) represents a flash-only image 50 of the scene. In this image the toy lion 30 is again illustrated with solid lines, while the background is black representing that the background portion has been canceled out by taking the difference of image 30 from image 40 and as a consequence is very distinguishable from the foreground. However, it should be noted that the actual colors of the foreground of the flash-only image 50 typically do not correspond to the colors found in either image 30 or image 40.

Figure 3:
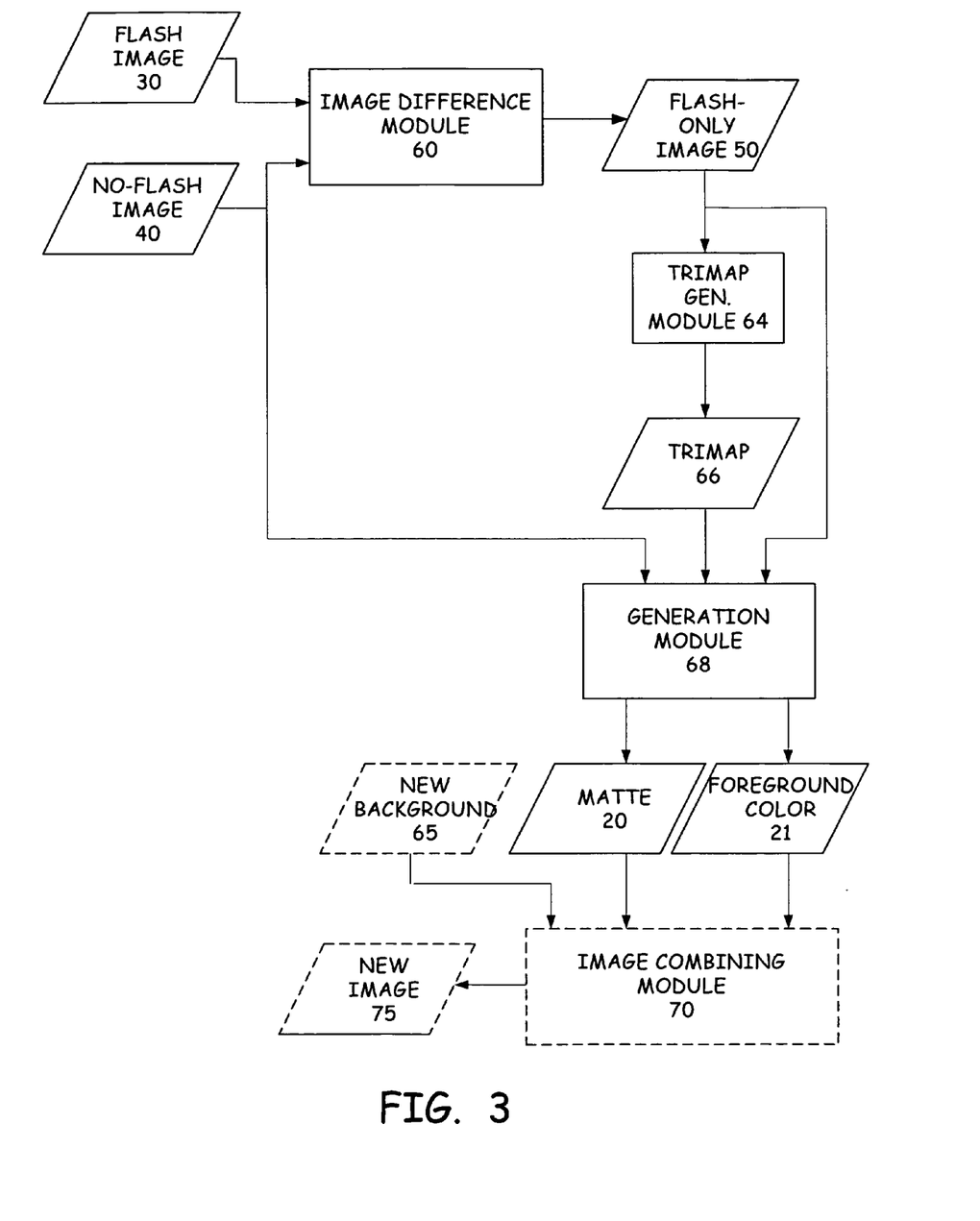
FIG. 3 is a block diagram of modules forming an image processing system.
Figure 4:
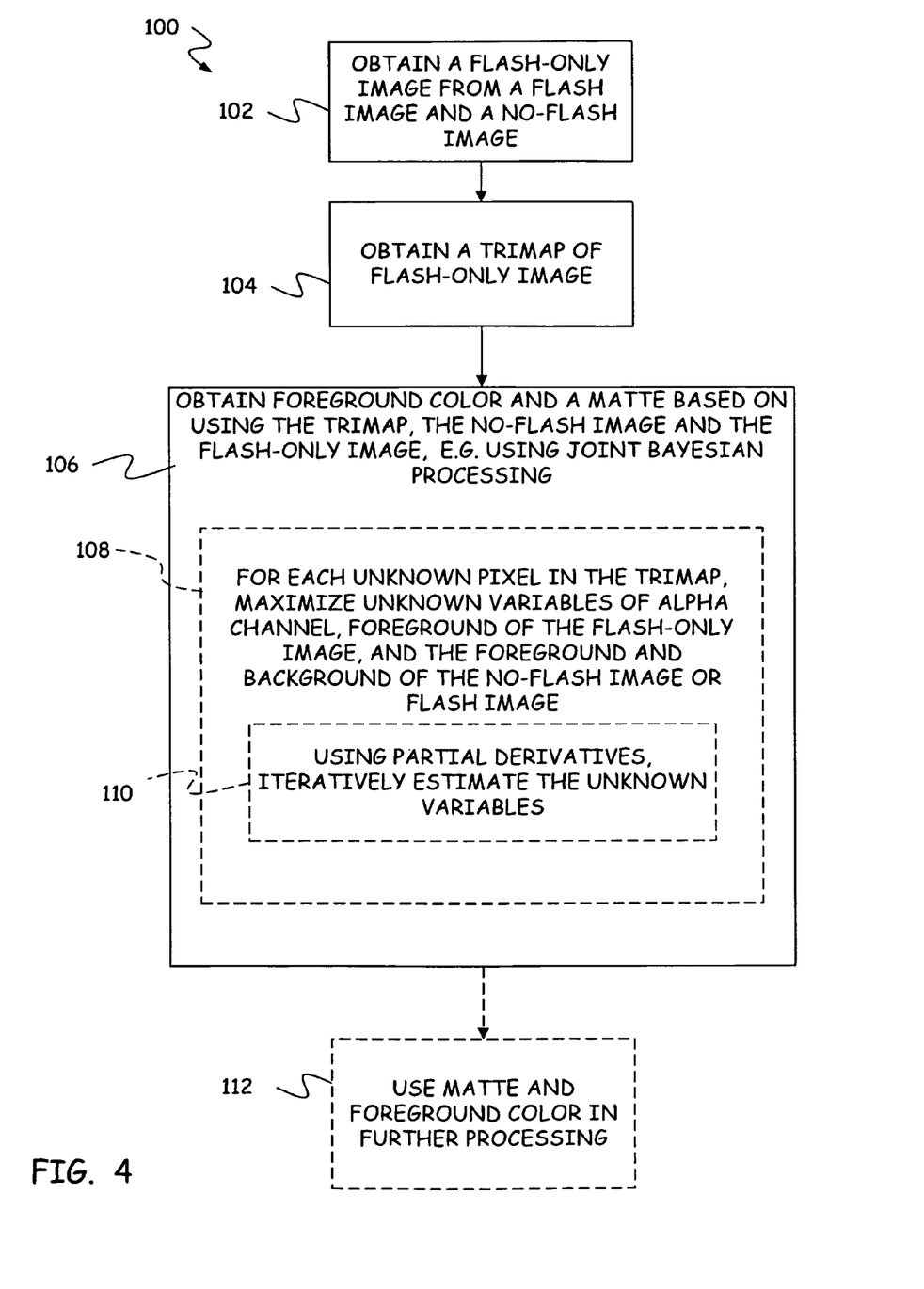
FIG. 4 is a flow chart for processing images.

FIG. 3 illustrates modules of image processing module 14 to generate matte 20 and foreground color 21, while FIG. 4 illustrates a method 100 for generating matte 20 and foreground color 21. In particular, at step 102, image difference module 60 receives the flash image 30 and the no-flash image 40 and generates flash-only image 50. Step 102 can include image or pixel alignment, if necessary.

Figure 5:
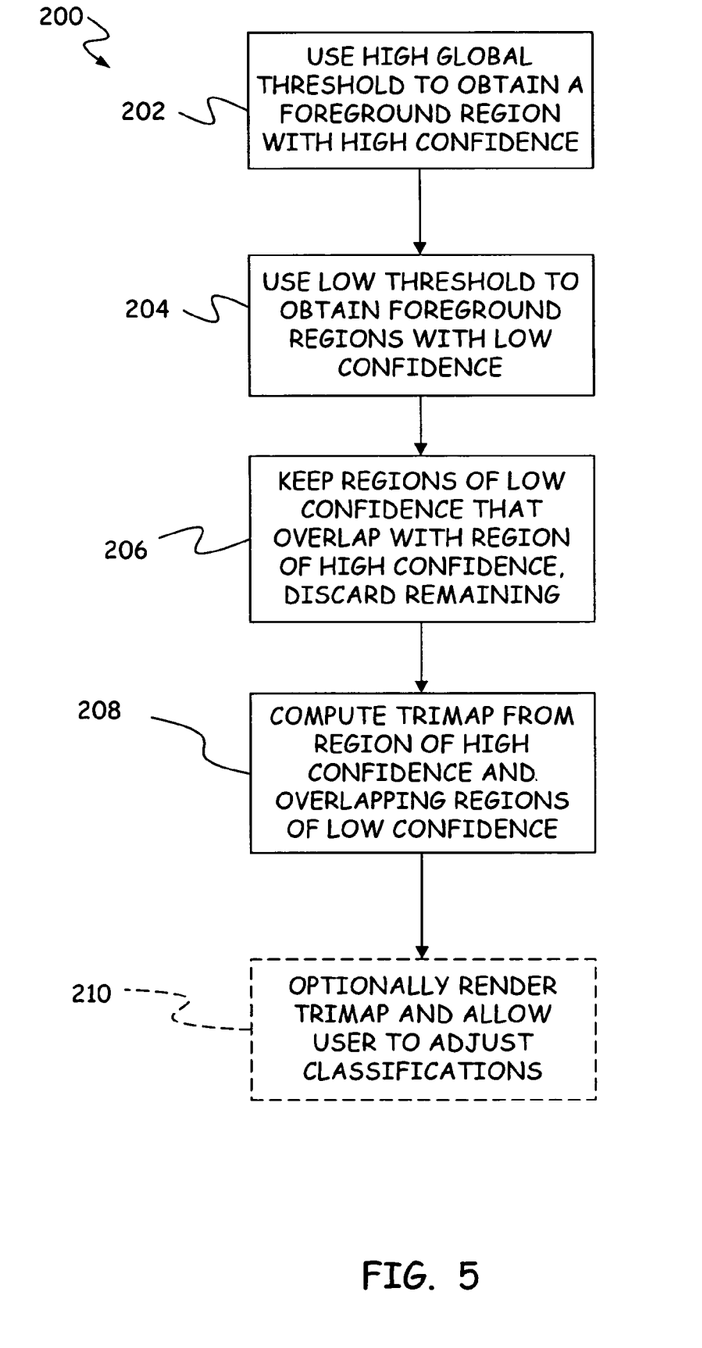
FIG. 5 is a flow chart for obtaining a trimap.

Although the flash-only image 50 may appear to be sufficient by itself to generate matte 20, the foreground matting problem is still under-constrained. In order to solve it, a trimap is helpful. Step 104 in FIG. 4 represents obtaining a trimap. While some matting techniques typically assume a user-supplied trimap, method 200 illustrated in FIG. 5 can produce a good initial trimap to substantially reduce user interaction. At step 202, in a first pass, a global high threshold T is used to detect a foreground region $\Omega_F^1$ with high confidence of the flash-only image I'. The threshold T is set as the first local minimum of a histogram (128 bins) of the intensity of the flash-only image I'. The histogram can be smoothed using a Gaussian kernel (e.g., with a variance of 7) to reduce noise. In a second pass illustrated at step 204, a lower threshold (e.g., 0.6 T) is used to detect foreground regions $\Omega_F^2$ with lower confidence. $\Omega_F^2$ is typically a set of connected components. At step 206, components in $\Omega_F^2$ that overlap with $\Omega_F^1$ are kept and all other isolated components in $\Omega_F^2$ are removed. The second pass of step 204 can effectively connect missed foreground regions from the first pass of step 202. At step 208, the trimap is computed by dilating or expanding the boundary of $\Omega_F^1 \cup \Omega_F^2$. It should be noted the range of dilation can vary depending on the object under consideration in the image. For example, objects with fur, the range of dilation can be 5-20 pixels; while objects with solid boundaries, the range of dilation can be 2 pixels. In some cases, the user may need to interactively adjust only the threshold T and dilation width to produce a reasonable-looking trimap. For very complex image cases, the trimap can be rendered on display 18, where for example, areas considered background are represented in black, foreground in white and unknown regions in grey. Using a suitable interface such as a paint-style interface the user can optionally touch up the trimap by changing the classification of one or more areas on the trimap at step 210. In FIG. 3, steps 202, 204, 206, 208 and optionally step 210 are performed by trimap generation module 64 to generate a trimap 66.

It should also be noted at times, the flash image is too bright and the no-flash image too dark for image composition. The user can either adjust the brightness or color of the recovered foreground color for a better composition by using any image editing software, or apply continuous flash adjustment, such as described by G. Petschnigg et al. in "Digital photography with flash and no-flash image pairs", published in Proceedings of ACM SIGGRAAPH 2004, 664-672, to interpolate estimated foreground colors from flash/no-flash images.

Referring back to the matte generation problem, a straightforward approach to solving the foreground flash matting problem is to apply the Bayesian matting algorithm in two separate steps:

1) estimate α and F' from equation (4); and 2) using the recovered α, estimate F and B from Equation (2) or $F^f$ and $B^f$ from equation (3).

In theory, this two-step approach yields a good matte from equation (4) no matter how similar the foreground and background are and how complex the background. In practice, however, the foreground flash matting equation (4) may be poorly conditioned when $\|F'\|$ is nearly zero. This is possible if a dark flash-only foreground color F' is obtained for instance, when the foreground has low reflectivity ($\rho(\omega_i,\omega_o) \approx 0$), or if the surface normal is nearly perpendicular to the flash direction ($\theta \approx 90°$). Another problem is pixel saturation, e.g., a highlight or white pixel may change very little between two images because it is saturated or nearly saturated. While such ill-conditioned pixels may constitute a small fraction of all unknown pixels, human eyes are sensitive to incorrect local discontinuities.

It has been found that these ill-conditioned pixels may be well-conditioned in the no-flash image I or flash image I', and in a further embodiment, an improved matte 20 can be obtained by using a joint Bayesian flash matting algorithm that uses information from both images.

Joint Bayesian Processing

By way of example, joint Bayesian processing, which is represented in method 100 at step 106 performed by generation module 68, will be described using the no-flash image I in Equation (2) (although the flash image could also be used) and the flash-only image I' in Equation (4). At step 108, for each unknown pixel in the trimap, a log likelihood function L(α,F,B,F'|I,I') of its unknown variables {α,F,B,F'} is maximized, given the observation {I,I'}:

$$\arg\max_{\alpha,F,B,F'} L(\alpha, F, B, F' \mid I, I') = \qquad \text{Eq. (5)}$$

$$\arg\max_{\alpha,F,B,F'} \{L(I \mid \alpha, F, B) + (I' \mid \alpha, F') +$$

$$L(F) + L(B) + L(F') + L(\alpha)\},$$

where L(·) is the log of probability P(·). The term L(I,I') is ignored because it is constant, and the log likelihood for matte L(α) is assumed to be constant since no appropriate prior exists for a complicated matte distribution.

The first two log likelihoods on the right hand side of Equation (5) measure the fitness of solved variables {α,F,B,F'} with respect to matting Equations (2) and (4):

$$L(I|\alpha,F,B) = -\|I - \alpha F - (1-\alpha)B\|/\sigma_I^2,$$

$$L(I'|\alpha,F') = -\|I' - \alpha F'\|/\sigma_{I'}^2,$$

where $\sigma_I^2$ and $\sigma_{I'}^2$ are noise variances of images I and I' respectively. By default and in one embodiment, these two variances are set to be the same, e.g., $\sigma_I^2 = \sigma_{I'}^2 = 32$.

The statistics of foreground colors are represented as an oriented Gaussian distribution. The log likelihood L(F) is modeled as $$L(F) = -(F - \overline{F})^T \Sigma_F^{-1} (F - \overline{F}), \qquad \text{Eq. (6)}$$

where $\{\overline{F}, \Sigma_F^{-1}\}$ are the mean and covariance matrix of the estimated Gaussian distribution, respectively. The background term L(B) is defined in a similar way with $\{\overline{B}, \Sigma_B^{-1}\}$.

For the foreground color F', an estimate is obtained for the oriented Gaussian distribution $\{\overline{F'}, \Sigma_{F'}^{-1}\}$ in the flash-only image I'. Thus, $$L(F') = -(F' - \overline{F'})^T \Sigma_{F'}^{-1} (F' - \overline{F'}). \qquad \text{Eq. (7)}$$

Taking the partial derivatives of (5) with respect to α and {F,B,F'} and equating them to zero results in $$\alpha = \frac{\sigma_{I'}^2 (F - B)^T (I - B) + \sigma_I^2 F'^T I'}{\sigma_{I'}^2 (F - B)^T (F - B) + \sigma_I^2 F'^T F'} \qquad \text{Eq. (8)}$$

and $$\begin{bmatrix} \Sigma_F^{-1} + I\alpha^2/\sigma_I^2 & I\alpha(1-\alpha)/\sigma_I^2 & 0 \\ I\alpha(1-\alpha)/\sigma_I^2 & \Sigma_B^{-1} + I\alpha^2/\sigma_I^2 & 0 \\ 0 & 0 & \Sigma_{F'}^{-1} + I\alpha^2/\sigma_{I'}^2 \end{bmatrix} \begin{bmatrix} F \\ B \\ F' \end{bmatrix} \qquad \text{Eq. (9)}$$

$$= \begin{bmatrix} \Sigma_F^{-1} \overline{F} + I\alpha/\sigma_I^2 \\ \Sigma_B^{-1} \overline{B} + I(1-\alpha)/\sigma_I^2 \\ \Sigma_{F'}^{-1} \overline{F'} + I'\alpha/\sigma_{I'}^2 \end{bmatrix},$$

where I is the 3×3 identity matrix and 0 the 3×3 zero matrix, which is illustrated at step 110, and comprises one embodiment for determining the maximum arguments. For example, to maximize (5), estimations are made iteratively of $\alpha$ and $\{F,B,F'\}$ using equations (8) and (9) until changes between two successive iterations are negligible (below a selected threshold). At the beginning of optimization, $\{F,B,F'\}$ are set to $\{\bar{F},\bar{B},\bar{F}'\}$.

Note that equation (8) is not a simple linear interpolation. It can adaptively select a well-conditioned matting equation from equation (2) or equation (4) to estimate the matte $\alpha$. If equation (2) is ill-conditioned (e.g., $F \approx B$), the estimate will be dominated by equation (4), i.e., $\alpha \approx F'^T I'/F'^T F'$. Alternatively, if equation (4) is ill-conditioned (e.g., $F' \approx 0$), will be automatically estimated by equation (2), i.e., $\alpha \approx (F-B)^T(I-B)/(F-B)^T(F-B)$. Thus, the underlying mechanism for this method selectively combines information from two images, robustly producing high-quality matting results. It should be noted that the matting results obtained by this procedure cannot be obtained by just combining two single-image matting results. However, it should be noted that a complex background may result in biased statistics to the level that equation (2) should not be relied upon fully. In these cases, $\sigma_I^2$ can be adjusted, where higher values of $\sigma_I^2$ will result in less reliance on the no-flash image.

Figure 2D:
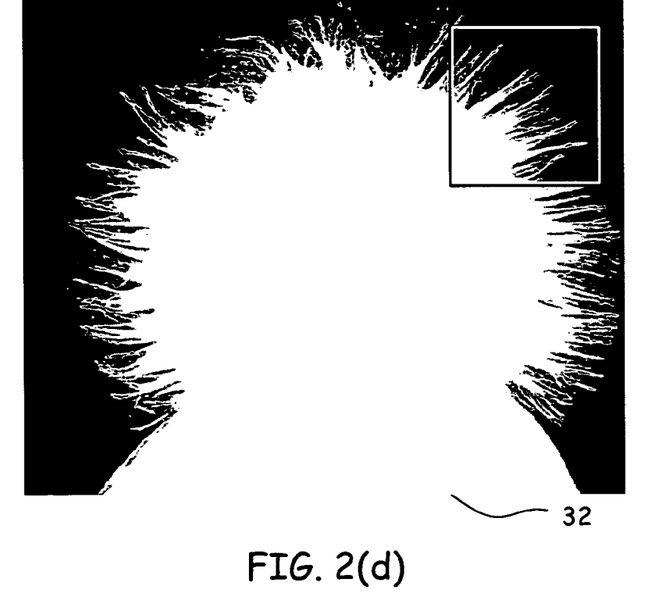
Figure 2E:
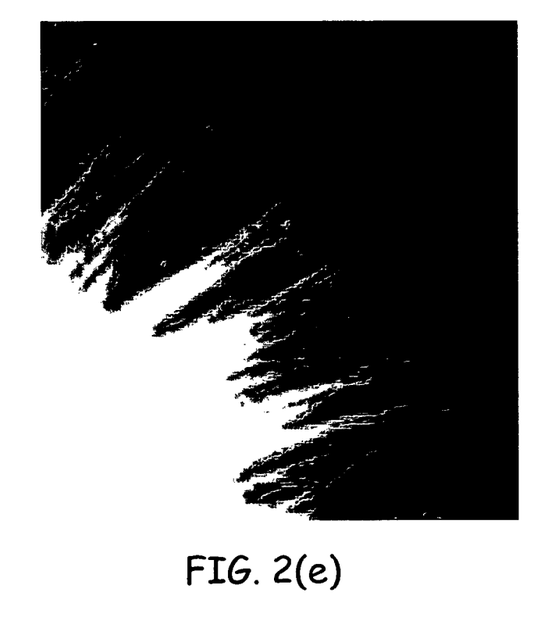

FIG. 2(d) is a pictorial representation of a matte for the toy lion 32, where portions of the matte representing the toy lion 32 are white and the background is black. Although there is the assumption that only the appearance of foreground is dramatically changed by the flash, in practice, it has been found joint Bayesian flash matting is robust enough to handle small appearance changes in the background caused by flash. FIG. 2(e) is an enlarged portion of the matte of FIG. 2(d) where it can be seen that the matte includes the fine fur edges of the toy lion 32 with minimal or any artifacts.

Figure 2F:
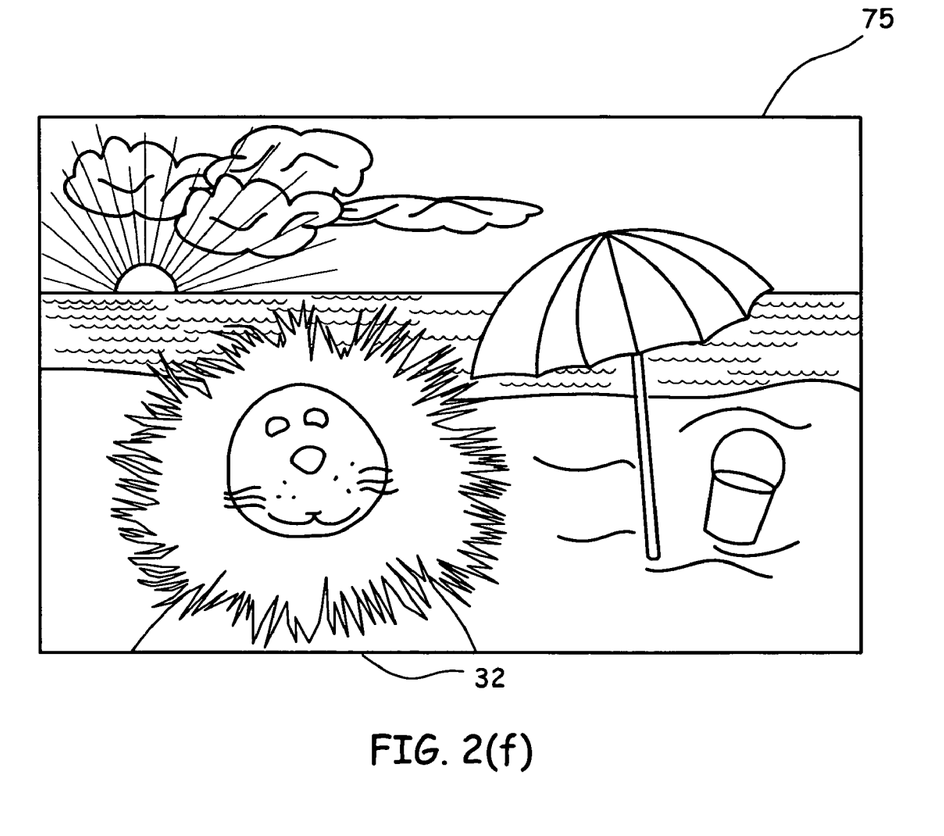

When the image processing module 14 further includes optional image combining module 70, new images can be generated as illustrated at step 112. In particular image combining module 70 uses the generated matte 20 and foreground color 21 to separate the foreground from the background, wherein the selected portion can then be applied or incorporated into to other images. In the example illustrated, a new background image 65 is used with the foreground image from the no-flash image 40 to form a new image 75. For example, FIG. 2(f) illustrates incorporation of the toy lion 32 into new image 75.

One exemplary method for obtaining images is provided below. The image capture device 12 (herein a digital camera) is set up to take the no-flash image, i.e., the focal length, the shutter speed and aperture are set at appropriate values to take a no-flash image of the foreground. The flash module 15 is then activated with a subsequent flash image taken. To obtain a high-quality matte, mounting the camera on a tripod is beneficial to obtain pixel-aligned images. Dynamic scenes can be taken depending on the speed in which flash/no-flash pair images can be acquired.

The images can be acquired in raw format and then converted into another format such as an 8-bit linear TIFF format. Disabling white balancing, gamma correction, and other non-linear operations in the raw conversion utility is beneficial so that the two images are converted identically. In one embodiment, a Canon EOS-20D digital camera and a Canon Speedlite 580EX external flash are suitable devices for the image capture device 12 and flash module 15, respectively.

To maximize change in the foreground between the flash and no-flash images, it may be beneficial to set the camera exposure compensation to −1 stop so the no-flash image is slightly under-exposed. Before capturing the flash image, the flash exposure compensation is set to +1 stop and the camera's though-the-lens light metering is allowed to determine the best flash intensity.

Current digital cameras are capable of continuous capture, typically between three and five frames per second. The capturing process above can be adapted to take advantage of this feature. When capturing fine details of a live subject, such as human hair in an outdoor scene, the flash is first activated. Two images are then taken using the camera's "continuous mode." The first captured image is the flash image. The second one will be the no-flash image because the flash appears only instantaneously for the first image, and will be in the process of recharging.

In flash photography, shadows are caused by two factors: depth discontinuities within the foreground object (i.e., portions of the foreground object can cause shadows on other portions of the object), or significant displacement between the flash unit and camera's optical center. Shadow pixels will erroneously result in $F' \approx 0$, thus degrading the matting results. If the foreground objects do not contain large internal depth discontinuities, the errors caused by shadow pixels are small and can be reduced by joint Bayesian matting method above. However, for a foreground object with large internal depth discontinuities, one solution is to use a ring-flash (e.g., a Canon Macro Ring Lite MR-14EX ring-flash) to produce a relatively shadow-free flash image.

If a flash mechanism such as the ring discussed above is unavailable or does not solve the shadowing problem, an alternative technique is to use a normal external flash module and capture multiple flash images $\{I_1^f, \ldots, I_N^f\}$ by evenly varying the positions of the flash around the image capture device's center. In one embodiment, four images are sufficient (one each at the left, right, top, and bottom positions). A practically shadow-free flash image $\bar{I}^f$ is created using a pixel-wise maximum operation:

$$\bar{I}^f = \max\{I_1^f, \ldots, I_N^f\}.$$

The flash image $\bar{I}^f$ is then used in the method discussed above.

It should be noted in scenes where the background and foreground are relatively close, the background change in the flash image may be too significant to be ignored. In such cases, the flash module 15 can be positioned such that it illuminates the background and not the foreground, in order to alter the appearance of the background instead between the flash and no-flash images. Assuming the foreground is virtually unaffected by the flash, the following matting equations are relevant:

$$\begin{cases} I = \alpha F + (1-\alpha)B \\ I^f = \alpha F + (1-\alpha)B^f \end{cases},$$

where it is assumed there is no change on the foreground color, yielding $F^f \approx F$. Similar to equation (4), a background oriented matting equation is represented as:

$$I' = I^f - I = (1-\alpha)(B^f - B) = (1-\alpha)B',$$

where $B' = (B^f - B)$ is the additional flash background color. In a manner similar to that discussed above joint Bayesian flash matting maximizes the likelihood $L(\alpha, F, B, B'|I, I')$.

In some situations, a more specialized flash unit is useful for non-static objects such as hair that may move around in outdoor scenes. Current flash units, such as the Canon EX series Speedlite flashes, usually support a high-speed sync mode that allows the use of a higher shutter speed (e.g., 1/2000 sec) than camera's X-sync speed. (X-sync speed is the camera's top shutter speed that can be used with any flash. Typically, it varies from 1/60 sec to 1/250 sec).

The capture process is as follows. The no-flash image is captured under normal conditions to provide the correct colors, while the flash image should be taken under very short exposure to ensure that the flash affects mostly the foreground object. The order the images are taken is optional. In this case, equations for the no-flash image I and flash image $I^f$ are as follows:

$$\begin{cases} I = \alpha F + (1-\alpha)B \\ I^f = \alpha F^f \end{cases},$$

where it is assumed that the background color $B^f \approx 0$ in the "quick-flash" image $I^f$. Joint Bayesian processing is used to maximize the likelihood $L(\alpha, F, B, F^f | I, I^f)$. However, this process is not always applicable because it requires a relatively dark ambient illumination and a flash with high-speed sync mode.

In another approach, a two-camera system with a common virtual camera center and a beam-splitter can be used. This system could also be electronically set up to capture flash/no-flash images in rapid succession. One camera is triggered slightly later than the other, with the delay being only the flash duration (typically 1 msec). The flash is activated so that only the first triggered camera records its effect. Another possibility would be to use a single programmable imaging camera with the exposure time of each pixel being independently controlled.

Exemplary Computing Environment

FIG. 6 illustrates an example of a suitable computing system environment 300 on which the concepts herein described may be implemented. The computing system environment 300 is again only one example of a suitable computing environment and is not intended to suggest any limitation as to the scope of use or functionality of the description below. Neither should the computing environment 300 be interpreted as having any dependency or requirement relating to any one or combination of components illustrated in the exemplary operating environment 300.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 6, an exemplary system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a locale bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 300.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way o example, and not limitation, FIG. 6 illustrates operating system 334, application programs 335, other program modules 336, and program data 337.

The computer 310 may also include other removable/non-removable volatile/nonvolatile computer storage media. By way of example only, FIG. 6 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 6, provide storage of computer readable instructions, data structures, program modules and other data for the computer 310. In FIG. 6, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies.

A user may enter commands and information into the computer 310 through input devices such as a keyboard 362, a microphone 363, and a pointing device 361, such as a mouse, trackball or touch pad. Other input devices (not shown) may include a scanner or the like. These and other input devices are often connected to the processing unit 320 through a user input interface 360 that is coupled to the system bus, but may be connected by other interface and bus structures, such as a parallel port or a universal serial bus (USB). A monitor 391 or other type of display device is also connected to the system bus 321 via an interface, such as a video interface 390.

The computer 310 may operate in a networked environment using logical connections to one or more remote computers, such as a remote computer 380. The remote computer 380 may be a personal computer, a hand-held device, a server, a router, a network PC, a peer device or other common network node, and typically includes many or all of the elements described above relative to the computer 310. The logical connections depicted in FIG. 6 include a locale area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user-input interface 360, or other appropriate mechanism. In a networked environment, program modules depicted relative to the computer 310, or portions thereof, may be stored in the remote memory storage device. By way of example, and not limitation, FIG. 6 illustrates remote application programs 385 as residing on remote computer 380. It will be appreciated that the network connections shown are exemplary and other means of establishing a communications link between the computers may be used.

It should be noted that the concepts herein described can be carried out on a computer system such as that described with respect to FIG. 6. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method of obtaining a matte suitable for separating a foreground object from a background object, the method comprising:
    obtaining a flash-only image of a scene based on a difference of an image of the scene taken with a flash and an image of the scene taken without a flash;
    obtaining a trimap based on the flash-only image; and
    obtaining a matte, using a computer, suitable for separating a foreground object from a background object of the scene based on the trimap, the flash-only image and at least one of the image of the scene taken without the flash and the image of the scene taken with the flash, and wherein obtaining the matte comprises selectively using information based on the flash-only image and at least one of the image of the scene taken without the flash and the image of the scene taken with the flash.

2. The method of claim 1 wherein obtaining the matte includes using Bayesian matting of the flash-only image and Bayesian matting at least one of the image of the scene taken without the flash and the image of the scene taken with the flash.

3. The method of claim 1 wherein obtaining the matte comprises maximizing unknown variables $\{\alpha,F,B,F'\}$ in a log likelihood function $L(\alpha,F,B,F'|I,I')$ where $\alpha$ is related to the matte, F is related to the foreground and B is related to the background for the image I comprising one of the image of the scene taken without the flash and the image of the scene taken with the flash, and F' is the foreground of the flash-only image I'.

4. The method of claim 3 wherein obtaining the matte comprises using partial derivatives of the log likelihood function $L(\alpha,F,B,F'|I,I')$.

5. The method of claim 4 wherein obtaining the matte comprises iteratively estimate the matte using the partial derivatives until changes between two successive iterations is below a selected threshold.

6. The method of claim 1 wherein obtaining the matte includes using Bayesian matting of the flash-only image and Bayesian matting of at least one of the image of the scene taken without the flash and the image of the scene taken with the flash.

7. The method of claim 6 wherein using Bayesian matting of the images comprises representing statistics of colors of the foregrounds and the backgrounds in the images as oriented Gaussian distributions.

8. The method of claim 1 wherein the flash illuminates the foreground.

9. The method of claim 1 wherein the flash illuminates the background.

10. The method of claim 1 wherein obtaining the trimap comprises:
    using a first threshold to obtain a foreground region of high confidence;
    using a second threshold to obtain a plurality of foreground regions of low confidence; and
    keeping only foreground regions of low confidence that overlap with the foreground region of high confidence.

11. A computer-readable storage medium having computer-executable instructions that when executed by a computer perform steps to process images comprising:
    obtaining a flash-only image of a scene based on a difference of an image of the scene taken with a flash and at least one of an image of the scene taken without a flash and the image of the scene taken with the flash;

obtaining a trimap based on the flash-only image, the trimap comprising regions of classification as definitely foreground object, definitely background object and unknown;

obtaining a matte suitable for separating a foreground object from a background object of the scene based on the flash-only image and at least one of the image of the scene taken without the flash and the image of the scene taken with the flash, and wherein obtaining the matte comprises obtaining the matte based on the trimap;

inserting the foreground object into another image having a different background object, using the matte and the color of the foreground object.

12. The computer readable storage medium of claim 11 wherein obtaining the trimap includes ascertaining a region of high confidence of the foreground object and selectively ascertaining regions of low confidence of the foreground object that overlap with the region of high confidence of the foreground object.

13. The computer readable storage medium of claim 12 wherein obtaining the trimap includes selectively allowing the user to adjust classifications of regions of the trimap.

14. The computer readable storage medium of claim 11 wherein obtaining the matte comprises maximizing unknown variables $\{\alpha,F,B,F'\}$ in a log likelihood function $L(\alpha,F,B,F'|I,I')$ for each pixel classified as unknown, where $\alpha$ is related to the matte, F is related to the foreground and B is related to the background for the image I comprising one of the image of the scene taken without the flash and the image of the scene taken with the flash, and F' is the foreground of the flash-only image I'.

15. The computer readable storage medium of claim 14 wherein obtaining the matte comprises using partial derivatives of the log likelihood function $L(\alpha,F,B,F'|I,I')$.

16. The computer readable storage medium of claim 15 wherein obtaining the matte comprises iteratively estimating the matte using the partial derivatives until changes between two successive iterations is below a selected threshold.

17. A system for image processing comprising:

a processor;

an image difference module that provides a flash-only image of a scene based on obtaining a difference of an image of the scene taken with a flash and an image of the scene taken without a flash;

a trimap generation module that, when executed on the processor, generates a trimap based on the flash-only image, wherein the trimap comprises regions of classification as definitely foreground object, definitely background object and unknown;

a generation module that generates a matte and a color of foreground object suitable for separating a foreground object from a background object of the scene based on the trimap and information based on Bayesian matting of the flash- only image and Bayesian matting of at least one of the image of the scene taken without the flash and the image of the scene taken with the flash; and an image combining module that uses the matte and the color of the foreground object to separate the foreground object of the image from the background object of the image in order to insert the foreground object into another image having a different background object.

18. The system of claim 17 wherein the generation module is adapted to maximize unknown variables $\{\alpha,F,B,F'\}$ in a log likelihood function $L(\alpha,F,B,F'|I,I')$ for each pixel of the trimap classified as unknown where $\alpha$ is related to the matte, F is related to the foreground and B is related to the background for the image I comprising one of the image of the scene taken without the flash and the image of the scene taken with the flash, and F' is the foreground of the flash-only image I'.

* * * * *

UNITED STATES PATENT AND TRADEMARK OFFICE
CERTIFICATE OF CORRECTION

PATENT NO. : 7,724,952 B2
APPLICATION NO. : 11/434567
DATED : May 25, 2010
INVENTOR(S) : Heung-Yeung Shum et al.

It is certified that error appears in the above-identified patent and that said Letters Patent is hereby corrected as shown below:

In column 6, line 5, before "$(I'|\alpha,F')+$" insert -- L --.

In column 14, line 19, in Claim 17, delete "flash- only" and insert -- flash-only --, therefor.

Signed and Sealed this
Eighth Day of February, 2011

David J. Kappos
*Director of the United States Patent and Trademark Office*